United States Patent
Takahashi

(10) Patent No.: US 12,519,354 B2
(45) Date of Patent: Jan. 6, 2026

(54) ROTARY ELECTRIC MACHINE AND MANUFACTURING METHOD THEREFOR

(71) Applicant: DENSO CORPORATION, Kariya (JP)

(72) Inventor: Yuki Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 337 days.

(21) Appl. No.: 18/450,307

(22) Filed: Aug. 15, 2023

(65) Prior Publication Data
US 2024/0039349 A1  Feb. 1, 2024

Related U.S. Application Data

(63) Continuation of application No. PCT/JP2022/005326, filed on Feb. 10, 2022.

(30) Foreign Application Priority Data
Feb. 17, 2021 (JP) .................................. 2021-023752

(51) Int. Cl.
*H02K 1/276* (2022.01)
*H02K 15/03* (2025.01)
*H02K 15/12* (2025.01)

(52) U.S. Cl.
CPC ............ *H02K 1/276* (2013.01); *H02K 15/03* (2013.01); *H02K 15/12* (2013.01); *H02K 2201/09* (2013.01); *H02K 2213/03* (2013.01)

(58) Field of Classification Search
CPC .......... H02K 1/276; H02K 1/27; H02K 15/03; H02K 15/12; H02K 2201/09; H02K 2213/03; H02K 15/00
See application file for complete search history.

(56) References Cited

U.S. PATENT DOCUMENTS

| 2003/0168924 A1 | 9/2003 | Murakami et al. |
| 2011/0079325 A1* | 4/2011 | Doi .............. H02K 1/2766 148/108 |

(Continued)

FOREIGN PATENT DOCUMENTS

| CN | 101626172 A | * | 1/2010 | ............... H02K 1/02 |
| CN | 107231044 A | * | 10/2017 | ............... H02K 1/02 |

(Continued)

OTHER PUBLICATIONS

Machine Translation of CN 107231044 A (Year: 2017).*
Machine Translation of CN 101626172 A (Year: 2010).*

*Primary Examiner* — Alexander A Singh
*Assistant Examiner* — Charlie Frank Mann, Jr.
(74) *Attorney, Agent, or Firm* — Maschoff Brennan

(57) ABSTRACT

There is provided a manufacturing method of a rotary electric machine, including: sintering each of a plurality of green compacts to obtain a plurality of sintered bodies; applying a grain boundary diffusion process on each sintered body by adhering an adhering material, which includes a heavy rare earth element, to at least one of a pair of planar surfaces of each sintered body, and then heating each sintered body to diffuse the heavy rare earth element into an inside of the sintered body; and forming a laminated body of a plurality of magnet segments by placing a corresponding one of the pair of planar surfaces of one of each adjacent two of the sintered bodies in contact with a corresponding one of the pair of planar surfaces of another one of the adjacent two of the sintered bodies.

17 Claims, 7 Drawing Sheets

(56) References Cited

U.S. PATENT DOCUMENTS

| | | | |
|---|---|---|---|
| 2017/0076846 A1* | 3/2017 | Tsukamoto | H01F 7/021 |
| 2020/0161939 A1 | 5/2020 | Takahashi et al. | |
| 2020/0162003 A1* | 5/2020 | Takahashi | H02K 1/187 |
| 2020/0228038 A1 | 7/2020 | Takahashi | |
| 2020/0244121 A1* | 7/2020 | Takahashi | H02K 21/14 |
| 2022/0006356 A1 | 1/2022 | Takahashi et al. | |
| 2022/0006357 A1 | 1/2022 | Takahashi et al. | |
| 2022/0006358 A1 | 1/2022 | Takahashi et al. | |
| 2022/0014074 A1 | 1/2022 | Takahashi et al. | |
| 2022/0014075 A1 | 1/2022 | Takahashi et al. | |
| 2022/0045578 A1 | 2/2022 | Takahashi et al. | |

FOREIGN PATENT DOCUMENTS

| | | | |
|---|---|---|---|
| JP | 2007-258455 A | 10/2007 |
| JP | 5251219 B2 | 7/2013 |
| JP | 2013-243886 A | 12/2013 |
| JP | 2020-039240 A | 3/2020 |

* cited by examiner

ROTARY ELECTRIC MACHINE AND MANUFACTURING METHOD THEREFOR

CROSS REFERENCE TO RELATED APPLICATIONS

This application is a continuation application of International Patent Application No. PCT/JP2022/005326 filed on Feb. 10, 2022, which designated the U.S. and claims the benefit of priority from Japanese Patent Application No. 2021-023752 filed on Feb. 17, 2021. The entire disclosures of all of the above applications are incorporated herein by reference.

TECHNICAL FIELD

The present disclosure relates to a rotary electric machine and a manufacturing method therefor.

BACKGROUND

Previously, there has been proposed a rotary electric machine that includes a magnetic field generator and an armature while the armature is placed at a location, at which the armature is opposed to the magnetic field generator in a radial direction. The magnetic field generator includes a plurality of magnets. The plurality of magnets form a plurality of magnetic poles, and polarities of the plurality of magnetic poles are alternately changed in a circumferential direction. The armature includes a plurality of multi-phase armature windings.

When the armature windings are energized, a magnetic field is generated. When the generated magnetic field crosses the magnet, an eddy current flows in the magnet.

SUMMARY

This section provides a general summary of the disclosure, and is not a comprehensive disclosure of its full scope or all of its features.

According to the present disclosure, there is provided a manufacturing method of a rotary electric machine. The rotary electric machine includes: a magnetic field generator which includes a plurality of magnets, wherein the plurality of magnets form a plurality of magnetic poles, and polarities of the plurality of magnetic poles are alternately changed in a circumferential direction; and an armature which includes a plurality of multi-phase armature windings and is placed at a location, at which the armature is opposed to the magnetic field generator in a radial direction, wherein one of the magnetic field generator and the armature is a rotor, and each of the plurality of magnets is formed by a laminated body of a plurality of magnet segments which are split in an axial direction of the rotor. The manufacturing method includes: sintering each of a plurality of green compacts, which are respectively formed by compressing and molding magnet powder grains, to obtain a plurality of sintered bodies, each of which has a pair of planar surfaces that are opposed to each other; applying a grain boundary diffusion process on each of the plurality of sintered bodies by adhering an adhering material, which includes a heavy rare earth element, to at least one of the pair of planar surfaces of each of the plurality of sintered bodies, and then heating each of the plurality of sintered bodies to diffuse the heavy rare earth element into an inside of the sintered body; and forming the laminated body of the plurality of magnet segments by placing a corresponding one of the pair of planar surfaces, on which the grain boundary diffusion process is applied, of one of each adjacent two of the plurality of sintered bodies in contact with a corresponding one of the pair of planar surfaces, on which the grain boundary diffusion process is applied, of another one of each adjacent two of the plurality of sintered bodies.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
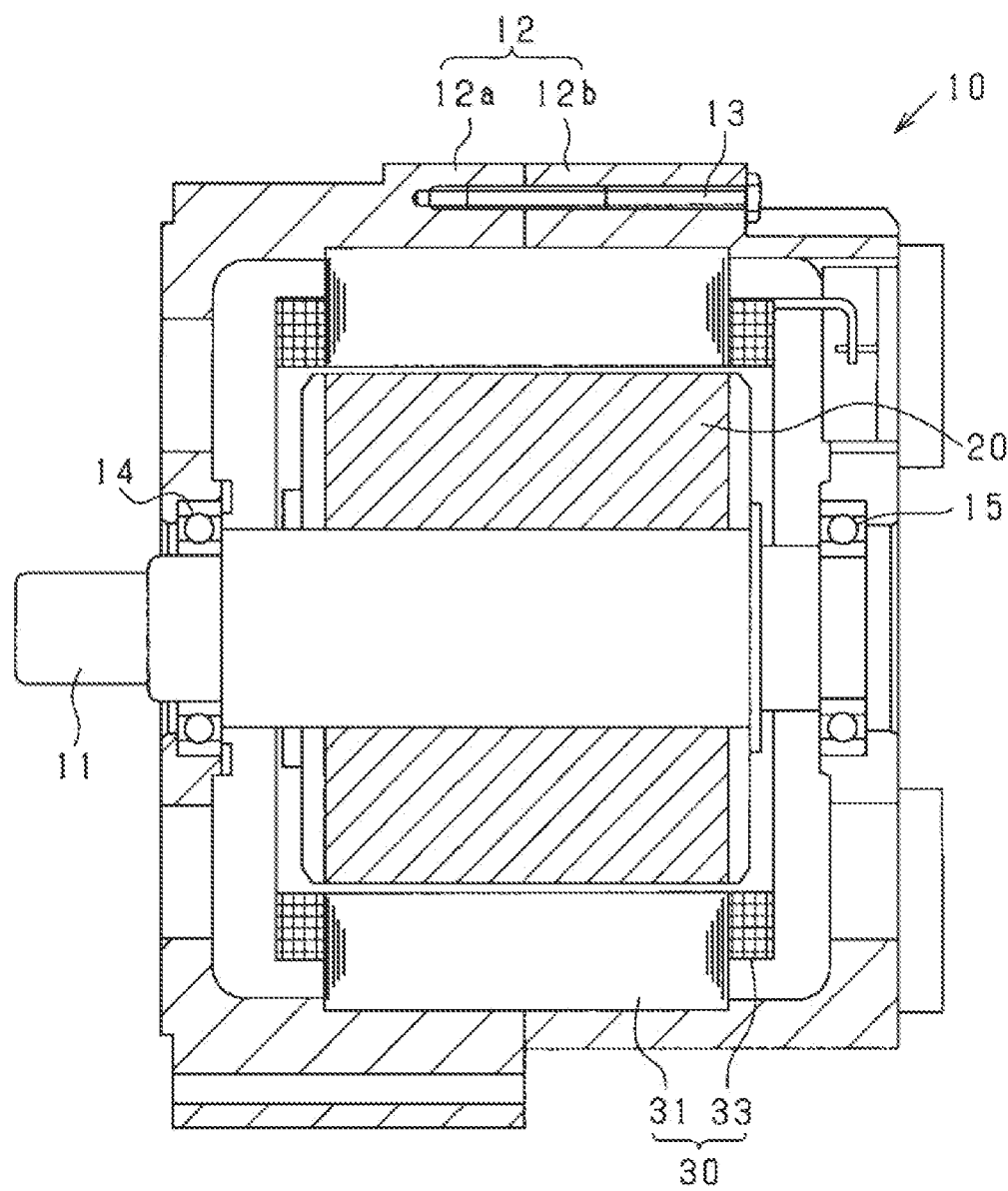
FIG. 1 is a longitudinal cross-sectional view of a rotary electric machine according to a first embodiment.

Previously, there has been proposed a rotary electric machine that includes a magnetic field generator and an armature while the armature is placed at a location, at which the armature is opposed to the magnetic field generator in a radial direction. The magnetic field generator includes a plurality of magnets. The plurality of magnets form a plurality of magnetic poles, and polarities of the plurality of magnetic poles are alternately changed in a circumferential direction. The armature includes a plurality of multi-phase armature windings.

When the armature windings are energized, a magnetic field is generated. When the generated magnetic field crosses the magnet, an eddy current flows in the magnet. In this case, for example, there is a disadvantage(s) caused by the eddy current, such as demagnetization of the magnet caused by the eddy current, and/or generation of eddy current loss.

According to a first measure, there is provided a manufacturing method of a rotary electric machine that includes:

a magnetic field generator which includes a plurality of magnets, wherein the plurality of magnets form a plurality of magnetic poles, and polarities of the plurality of magnetic poles are alternately changed in a circumferential direction; and an armature which includes a plurality of multi-phase armature windings and is placed at a location, at which the armature is opposed to the magnetic field generator in a radial direction, wherein one of the magnetic field generator and the armature is a rotor, and each of the plurality of magnets is formed by a laminated body of a plurality of magnet segments which are split in an axial direction of the rotor, the manufacturing method including:

sintering each of a plurality of green compacts, which are respectively formed by compressing and molding magnet powder grains, to obtain a plurality of sintered bodies, each of which has a pair of planar surfaces that are opposed to each other;

applying a grain boundary diffusion process on each of the plurality of sintered bodies by adhering an adhering material, which includes a heavy rare earth element, to at least one of the pair of planar surfaces of each of the plurality of sintered bodies, and then heating each of the plurality of sintered bodies to diffuse the heavy rare earth element into an inside of the sintered body; and forming the laminated body of the plurality of magnet segments by placing a corresponding one of the pair of planar surfaces, on which the grain boundary diffusion process is applied, of one of each adjacent two of the plurality of sintered bodies in contact with a corresponding one of the pair of planar surfaces, on which the grain boundary diffusion process is applied, of another one of each adjacent two of the plurality of sintered bodies.

When the eddy current flows in the magnet, the demagnetization of the magnet, which is induced by the eddy current, may possibly occur. According to the first measure, by sintering each of the plurality of green compacts, which are respectively formed by compressing and molding the magnet powder grains, the plurality of sintered bodies, each of which has the pair of planar surfaces opposed to each other, are obtained. Then, the grain boundary diffusion process is applied on each of the plurality of sintered bodies by adhering the adhering material, which includes the heavy rare earth element, to the at least one of the pair of planar surfaces of each of the plurality of sintered bodies, and then each of the plurality of sintered bodies is heated to diffuse the heavy rare earth element into an inside of the sintered body. The sintered body, on which the above-described process is applied, has the increased coercivity while maintaining the residual magnetic flux density. Therefore, it is possible to limit the demagnetization of the magnet caused by the eddy current.

The diffusion of the heavy rare earth element is limited to a range which is a predetermined depth from the magnet surface. With respect to this point, according to the first measure, since each of the plurality of magnets is formed by the laminated body of the plurality of magnet segments, an axial length dimension of each of the plurality of magnet segments, which form the laminated body, is small. Since each magnet segment is formed from the sintered body, on which the grain boundary diffusion process is applied, the length dimension of this sintered body in the axial direction is small. Therefore, in the case of the applying the grain boundary diffusion process on the sintered body, the heavy rare earth element can be suitably diffused into the inside of the sintered body, and the coercivity can be suitably increased.

According to a second measure, which belongs the first measure, the applying of the grain boundary diffusion process includes adhering the adhering material only to the at least one of the pair of planar surfaces among a plurality of surfaces of each of the plurality of sintered bodies and then heating each of the plurality of sintered bodies.

According to the second measure, the adhering material, which includes the heavy rare earth element, is applied to only the at least one of the pair of planar surfaces among the plurality of surfaces of each of the plurality of sintered bodies. Therefore, the diffusion process can be simplified.

According to a third measure, which belongs to the second measure, the applying of the grain boundary diffusion process includes adhering the adhering material only to each of the pair of planar surfaces among the plurality of surfaces of each of the plurality of sintered bodies and then heating each of the plurality of sintered bodies.

According to the third measure, the heavy rare earth element can be suitably diffused into the inside of the sintered body from each of the pair of planar surfaces while simplifying the diffusion process.

According to a fourth measure, which belongs the third measure, a thickness dimension of each of the plurality of sintered bodies, on which the grain boundary diffusion process is applied, is equal to or smaller than 16 mm.

In a case where the grain boundary diffusion process is applied to the sintered body by adhering the adhering material to one planar surface among a plurality of surfaces of the sintered body, a distribution of the coercivity in a direction that is directed from the one planar surface toward the inside of the sintered body is analyzed. As a result of this analysis, an improvement in the coercivity is observed in a range that is from the surface to a depth of about 8 mm. Therefore, in the fourth measure, the thickness dimension of the sintered body is set to be equal to or smaller than 16 mm. With this setting, the heavy rare earth element can be more suitably diffused into the inside of the sintered body.

Here, the thickness dimension of the sintered body is preferably, for example, equal to or smaller than 8 mm as in a fifth measure. This thickness dimension setting is based on the finding that the coercivity is largely improved in the range that is from the surface to a depth of about 4 mm.

According to a sixth measure, which belongs to the second measure, the applying of the grain boundary diffusion process includes adhering the adhering material only to one of the pair of planar surfaces among the plurality of surfaces of each of the plurality of sintered bodies and then heating each of the plurality of sintered bodies; and a thickness dimension of each of the plurality of sintered bodies, on which the grain boundary diffusion process is applied, is equal to or smaller than 8 mm.

According to the sixth measure, in the case where the grain boundary diffusion process is applied to only the one of the pair of planar surfaces, the heavy rare earth element can be more suitably diffused into the inside of the sintered body.

Here, the thickness dimension of the sintered body is preferably, for example, equal to or smaller than 4 mm as in a seventh measure.

According to an eighth measure, which belongs to any one of the first to seventh measures, the manufacturing method includes obtaining the plurality of green compacts, in each of which an orientation of an easy magnetization axis at one location, which is closer to a d-axis serving as a magnetic pole center than to a q-axis serving as a magnetic pole boundary, is closer to an orientation of the d-axis than an orientation of the easy magnetization axis at another location, which is closer to the q-axis than to the d-axis, by filling the magnet powder grains into a molding space of a molding die formed in conformity with a shape of each of the plurality of magnet segments and then compressing and molding the magnet powder grains filled in the molding space in a magnetic field; and the sintering of each of the plurality of green compacts results in that each of the plurality of sintered bodies has a near net shape of a corresponding one of the plurality of magnet segments.

It is conceivable to obtain a magnet segment, which has a net shape and has a pair of planar surfaces, by applying a grinding process to a sintered body of magnet powder grains through use of, for example, a grinding wheel, a cutting blade or a wire saw. However, in this case, depending on the grinding mode of the sintered body, the orientation of the easy magnetization axis of the magnet segment obtained through the grinding may be shifted from the intended orientation of the easy magnetization axis, and thereby the intended magnetic flux may not be realized.

With respect to this issue, according to the eighth measure, the sintered body can be obtained through a near net shape processing technique. Thus, it is possible to guarantee an orientation in which a deviation between the orientation of the easy magnetization axis of the magnet segment and the intended orientation of the easy magnetization axis is suitably limited.

According to a ninth measure, there is provided a rotary electric machine including:
- a magnetic field generator which includes a plurality of magnets, wherein the plurality of magnets form a plurality of magnetic poles, and polarities of the plurality of magnetic poles are alternately changed in a circumferential direction; and
- an armature which includes a plurality of multi-phase armature windings and is placed at a location, at which the armature is opposed to the magnetic field generator in a radial direction, wherein:
- one of the magnetic field generator and the armature is a rotor;
- each of the plurality of magnets is formed by a laminated body of a plurality of magnet segments which are split in an axial direction of the rotor; and
- only a contact surface among a plurality of surfaces of each of each adjacent two of the plurality of magnet segments, which are adjacent to each other in the axial direction, is treated by grain boundary diffusion of a heavy rare earth element for diffusing the heavy rare earth element from the contact surface into an inside of the magnet segment while the contact surfaces of each adjacent two of the plurality of magnet segments contact with each other.

According to the ninth measure, the heavy rare earth element can be more suitably diffused into the inside of the sintered body, and the coercivity of the magnet can be more suitably enhanced. Therefore, it is possible to limit the demagnetization of the magnet caused by the eddy current.

According to a tenth or eleventh measure, the magnetic field generator includes a magnetic field generator core, to which the plurality of magnets are installed;
- each of the plurality of magnets is oriented such that an orientation of an easy magnetization axis at one location, which is closer to a d-axis serving as a magnetic pole center than to a q-axis serving as a magnetic pole boundary, is closer to an orientation of the d-axis than an orientation of the easy magnetization axis at another location, which is closer to the q-axis than to the d-axis; and
- at least a portion of a q-axis core portion of the magnetic field generator core is placed in a magnetically saturated state by a magnetic flux of one or more of the plurality of magnets.

According to the tenth or eleventh measure, since at least the portion of the q-axis core portion is placed in the magnetically saturated state, the magnetic permeability of the magnetically saturated portion of the q-axis core portion is reduced thereby resulting in a reduction in the inductance. Therefore, the amount of magnetic flux, which is generated in response to the energization of the stator windings and crosses the magnet, can be reduced. As a result, generation of the eddy current loss of the magnet can be limited.

Here, for example, each of the plurality of magnets may be embedded in the magnetic field generator core as in a twelfth measure.

Alternatively, each of the plurality of magnets may be installed to a peripheral surface of the magnetic field generator core which faces the armature in the radial direction as in a thirteenth measure.

Each of the plurality of magnets is oriented such that the orientation of the easy magnetization axis at the one location, which is closer to the d-axis than to the q-axis, is closer to the orientation of the d-axis than the orientation of the easy magnetization axis at the another location, which is closer to the q-axis than to the d-axis, so that the magnetic flux component in the circumferential direction near the q-axis in the magnet is large. Therefore, the q-axis core portion of the magnetic field generator core of the thirteenth measure is placed in the magnetically saturated state. Thus, the amount of magnetic flux, which flows from the armature side and crosses the magnet, can reduced, and thereby the generation of the eddy current loss of the magnet can be limited.

According to a fourteenth measure, which belongs to any one of the ninth to thirteenth measures, the plurality of multi-phase armature windings are wound as a plurality of short pitch windings.

In the case where the armature windings of the rotary electric machine are wound as the short pitch windings, a change in the magnetic flux, which flows from the armature and crosses the magnet, is larger than a case where the stator windings are wound as full pitch windings, so that the eddy current loss at the magnet tends to be large. Therefore, the merit of applying any one of the eighth to fourteenth measures to the rotary electric machine, at which the eddy current loss tends to be large, is significant.

Hereinafter, embodiments of the present disclosure will be described with reference to the drawings.

A rotary electric machine of the present disclosure is used as, for example, a vehicle driving power source. However, the rotary electric machine of the present disclosure can be widely used for industrial machines, vehicles, aircrafts, home appliances, OA machines, game machines and the like.

First Embodiment

Figure 2:
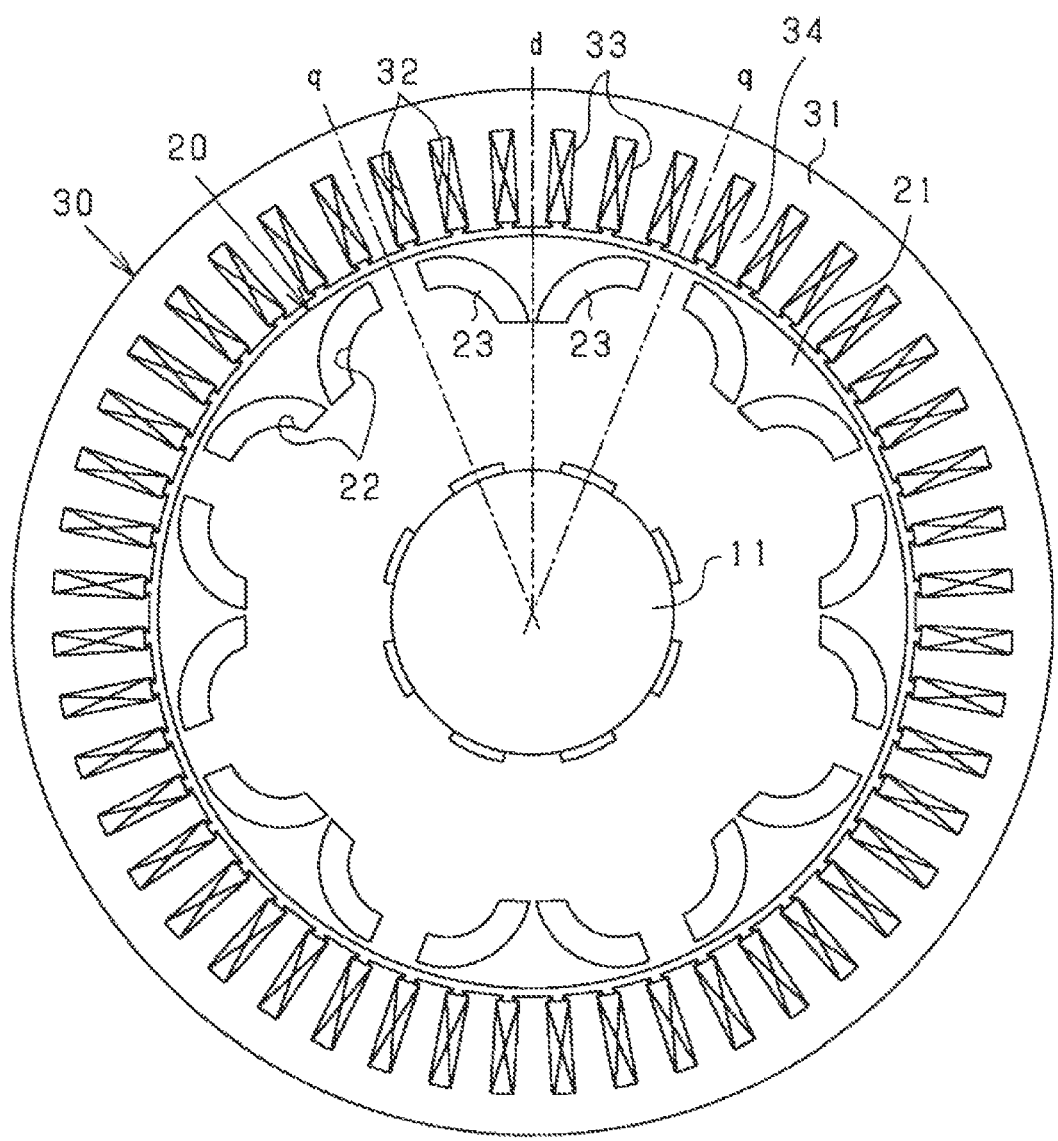
FIG. 2 is a transverse cross-sectional view of the rotary electric machine.

A rotary electric machine 10 of the present embodiment is an interior permanent magnet rotary electric machine (IPM motor) of an inner rotor type used as a vehicle electric motor. The rotary electric machine 10 will be schematically described with reference to FIGS. 1 and 2. FIG. 1 is a longitudinal cross-sectional view of the rotary electric machine 10 taken in a direction along a rotatable shaft 11. FIG. 2 is a transverse cross-sectional view of a rotor 20 and a stator 30 taken in a direction perpendicular to the rotatable shaft 11. In the following description, a direction, in which the rotatable shaft 11 extends, is defined as an axial direction, and a direction, which radiates from the rotatable shaft 11, is defined as a radial direction. Furthermore, a direction, which extends circumferentially around the rotatable shaft 11, is defined as a circumferential direction. In the present embodiment, the rotor 20 serves as a magnetic field generator, and the stator 30 serves as an armature.

The rotary electric machine 10 includes: the rotor 20 which is fixed to the rotatable shaft 11; the stator 30 which is shaped in a circular ring form and is placed at a location where the stator 30 surrounds the rotor 20; and a housing 12 which receives the rotor 20 and the stator 30. The rotor 20 and the stator 30 are coaxially arranged. The rotor 20 is placed on a radially inner side of the stator 30 and is opposed to the stator 30. A predetermined air gap is formed between an inner peripheral surface of the stator 30 and an outer peripheral surface of the rotor 20. The housing 12 includes two housing members 12a, 12b which are shaped in a bottomed tubular form. The housing members 12a, 12b are fixed together by bolts 13 in a state where openings of the housing members 12a, 12b abut with each other. Two bearings 14, 15 are installed in the housing 12, and the rotatable shaft 11 and the rotor 20 are rotatably supported by the bearings 14, 15.

As shown in FIG. 2, the rotor 20 includes a rotor core 21 that is shaped in a hollow cylindrical tubular form, and an inner peripheral surface of the rotor core 21 is fixed to the rotatable shaft 11. The rotor core 21 is made of a soft magnetic material and is formed by, for example, stacking a large number of electromagnetic steel plates. The rotor core 21 has a plurality of magnet receiving holes 22 which are arranged one after another in the circumferential direction, and each of the magnet receiving holes 22 receives a corresponding one of a plurality of magnets (permanent magnets) 23.

The stator 30 includes a stator core 31 which is shaped generally in a cylindrical tubular form and serves as an armature core. The stator core 31 is made of a soft magnetic material and is formed by, for example, stacking a large number of electromagnetic steel plates. The stator core 31 has a plurality of slots 32 which extends through the stator core 31 in the axial direction and are arranged at equal intervals in the circumferential direction. A plurality of stator windings 33, which serve as, for example, three-phase armature windings (multi-phase armature windings), are wound at the slots 32. In the present embodiment, the number of the slots 32 is forty-eight, and these slots 32 are arranged at equal intervals in the circumferential direction such that the three-phase stator windings 33 are received in the slots 32 in conformity with the number of magnetic poles of the rotor 20.

Figure 3:
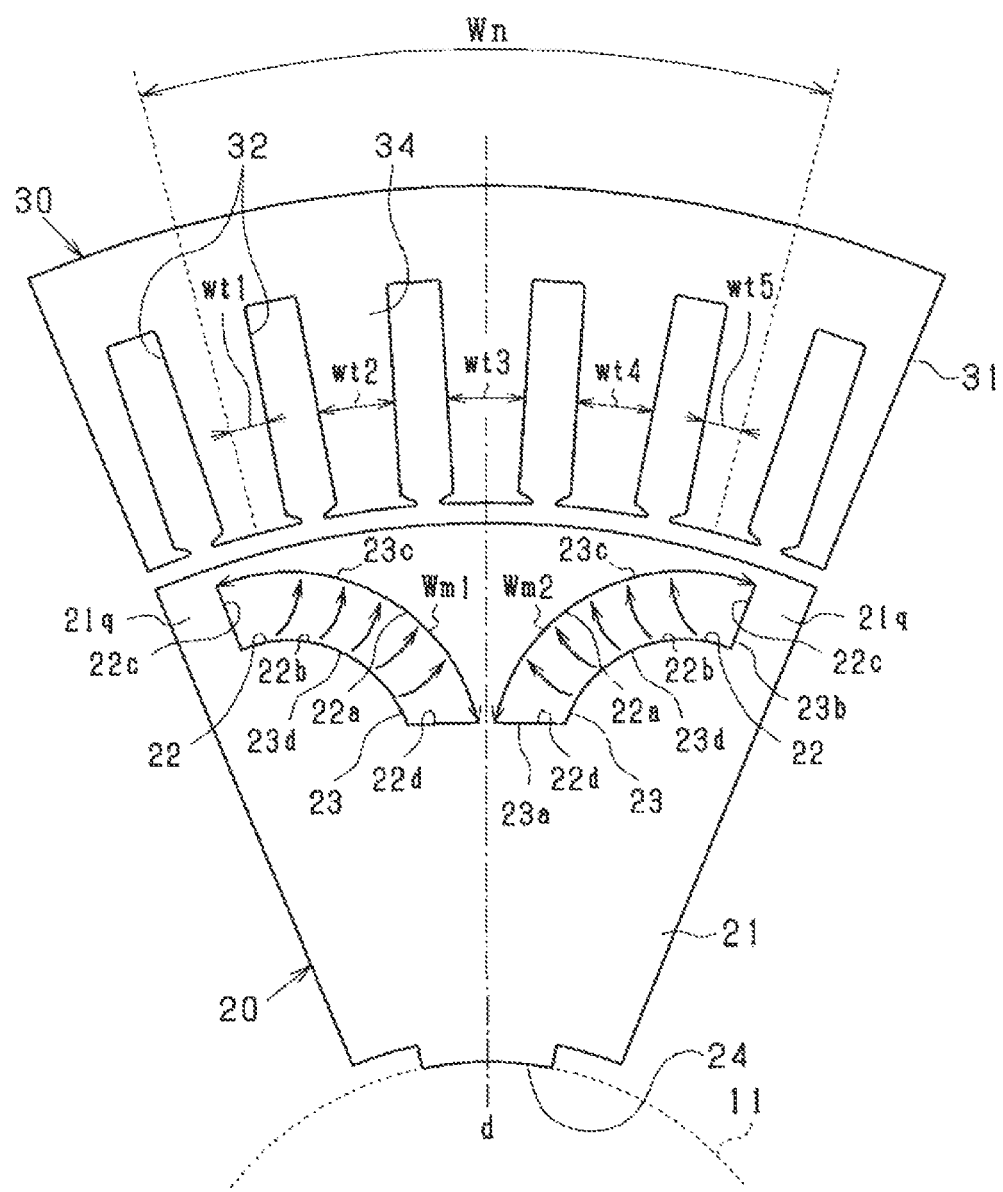
FIG. 3 is a transverse cross-sectional view of a rotor and a stator.

Next, with reference to FIG. 3, the magnet receiving holes 22 of the rotor core (serving as a magnetic field generator core) 21 and the magnets 23 will be described. FIG. 3 shows one of a plurality of magnetic poles (e.g., a total of eight magnetic poles) of the rotary electric machine 10.

The rotor core 21 is shaped generally in a cylindrical tubular form and is formed by stacking a large number of electromagnetic steel plates, and a through-hole is formed at a center of the rotor core 21. The rotor core 21 is fixed to the rotatable shaft 11 by fitting the rotatable shaft 11 into the through-hole of the rotor core 21. The rotor core 21 has d-axes and q-axes.

The magnet receiving holes (in the present embodiment, sixteen magnet receiving hole) 22, which extend through the rotor core 21 in the axial direction, are arranged at predetermined intervals in the circumferential direction at a location that is adjacent to the outer peripheral surface of the rotor core 21, which is opposed to the inner peripheral surface of the stator 30. Each corresponding adjacent two of the magnet receiving holes 22 form a pair, and the pair of magnet receiving holes 22 form a generally V-shape such that a circumferential distance between the pair of magnet receiving holes 22 is progressively increased toward a radially outer side. The pair of magnet receiving holes 22 are symmetric with respect to the corresponding d-axis, which serves as a magnetic pole center. In the present embodiment, the pairs of magnet receiving holes 22, each of which has an arcuate form, are formed in the rotor core 21.

Each of the magnet receiving holes 22 is formed by two curved surfaces 22a, 22b and two connecting surfaces 22c, 22d while the curved surfaces 22a, 22b are spaced from each other by a constant distance along an entire extent thereof. Each of the curved surfaces 22a, 22b is in an arcuate form, and each of the connecting surfaces 22c, 22d is in a planar form and connects between corresponding circumferential ends of the curved surfaces 22a, 22b. Among the connecting surfaces 22c, 22d, the connecting surface 22c, which is adjacent to the q-axis, is parallel with the q-axis. Furthermore, the connecting surface 22d, which is adjacent to the d-axis, is perpendicular to the d-axis.

Each of the magnet receiving hole 22 receives the corresponding magnet 23, which is in a shape that corresponds to a hole shape of the magnet receiving hole 22. In this case, the pair of magnets 23, which are received in the pair of magnet receiving holes 22, form one magnetic pole. Each magnet 23 has two end portions 23a, 23b which are opposed to each other in a longitudinal direction of the magnet 23, and an easy magnetization axis of the magnet 23 (i.e., an orientation of an internal magnetic field line, which is a magnetic path) is indicated by an arrow. The magnet 23 is formed in such a way that an orientation of the easy magnetization axis changes from an orientation, which is close to a direction perpendicular to the q-axis, to an orientation, which is close to a direction parallel with the d-axis, from the end portion 23b, which is adjacent to the q-axis, toward the end portion 23a, which is adjacent to the d-axis, in a non-linear form that is convex toward a side which is opposite to the stator. Specifically, the magnetic path in the magnet 23 is defined in a direction that crosses the magnet 23a transverse direction of the magnet 23, and the orientation of the magnetic path is in a form of an arc that is convex toward the central axis of the rotor core 21.

The magnet 23 has a pair of magnetic flux acting surfaces 23c, 23d which are opposed to each other. Among the pair of magnetic flux acting surfaces 23c, 23d, the magnetic flux acting surface 23c is closer to the stator 30 than the magnetic flux acting surface 23d. Here, the magnetic flux acting surface is defined as an inflow surface or an outflow surface of the magnetic flux at the magnet 23.

FIG. 3 indicates the two magnets 23, which form the N-pole. However, in a case where the two magnets 23 are configured to form the S-pole, the orientation of the easy magnetization axis of each of the magnets 23 is opposite to the orientation of the easy magnetization axis shown in FIG. 3.

In the present embodiment, the stator 30 has a plurality of teeth 34. Each of the teeth 34 is interposed between circumferentially adjacent two portions of the stator windings 33 and serves as an inter-conductor member, i.e., a member held between the conductors.

In the present embodiment, there is implemented a state where at least a portion of a q-axis core portion $21q$ of the rotor core 21 is placed in a magnetically saturated state by a magnetic flux of the magnet 23. The q-axis core portion $21q$ is a portion of the rotor core 21, which extends across the q-axis held between the pair of magnets 23 arranged in the circumferential direction. The magnetic permeability at the portion, which is magnetically saturated in the q-axis core portion 21*q*, is reduced, and the inductance is reduced. Therefore, the amount of magnetic flux, which is generated in response to the energization of the stator windings 33 and crosses the magnet 23, can be reduced. As a result, generation of the eddy current loss of the magnet 23 can be limited.

The magnetic saturation of the q-axis core portion 21*q*, which is saturated by the magnetic flux of the magnet 23, may be realized by, for example, the following two configurations. As a first configuration among the two configurations, the magnet 23 is oriented such that as shown in FIG. 3, an orientation of the easy magnetization axis at one location, which is closer to the d-axis than to the q-axis, is closer to an orientation of the d-axis than an orientation of the easy magnetization axis at another location, which is closer to the q-axis than to the d-axis.

Next, a second configuration among the two configurations will be described. A portion of the stator 30 functions as one magnetic pole (the N-pole or the S-pole) when the stator windings 33 are energized. A width dimension of the teeth 34, which are present in a length range (Wn) of the portion that extends in the circumferential direction and functions as the one magnetic pole, corresponds to a circumferential width dimension (Wt) of the teeth 34, which serve as the inter-conductor members and are present within the one magnetic pole. In the example shown in FIG. 3, the circumferential width dimension (Wt) is Wt=Wt1+Wt2+Wt3+Wt4+Wt5. Here, each of Wt2, Wt3 and Wt4 corresponds to a circumferential width dimension of a corresponding one of the teeth 34, and each of Wt1 and Wt2 is one half of a circumferential width dimension of a corresponding one of the teeth 34.

A longitudinal dimension of the magnets 23 (i.e., a dimension of the magnetic flux acting surfaces 23*c* of the magnets 23) in the one magnetic pole corresponds to a circumferential width dimension (Wm) of the magnets 23 in the one magnetic pole. As shown in FIG. 3, the pair of magnetic flux acting surfaces 23*c* are placed on the left side and the right side of the d-axis in the one magnetic pole, so that the circumferential width dimension (Wm) of the magnets 23 in the one magnetic pole is a sum of a dimension (Wm1) of the magnetic flux acting surface 23*c* placed on the left side and a dimension (Wm2) of the magnetic flux acting surface 23*c* placed on the right side of the d-axis.

The second configuration is that in a case where a saturated magnetic flux density of the stator core 31 is denoted by Bs, and a residual magnetic flux density of the magnet 23 is denoted by Br, there is satisfied a relationship of Wt×Bs≤Wm×Br. The q-axis core portion 21*q* is magnetically saturated by: the second configuration for outputting the strong magnetic flux, which satisfies the relationship of Wt×Bs≤Wm×Br, toward the stator 30; and the first configuration described above.

Figure 4:
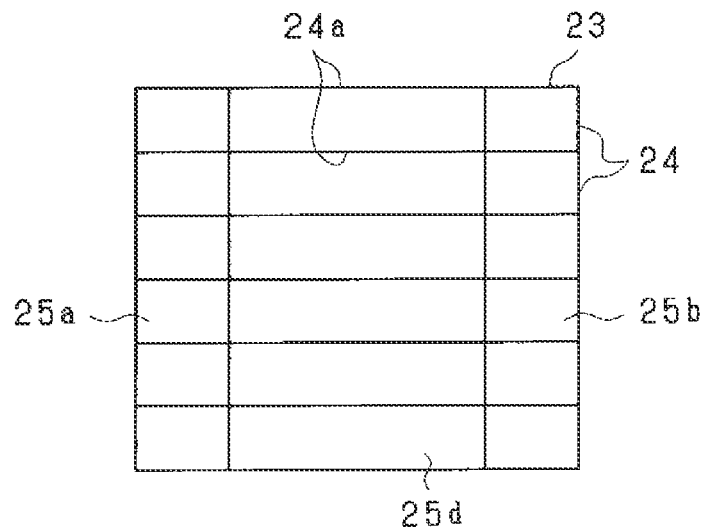
FIG. 4 is a diagram showing a structure of a magnet.

Next, the magnet 23 will be further described with reference to FIG. 4.

In the present embodiment, the magnet 23 is an anisotropic rare-earth magnet, specifically a sintered neodymium magnet. In the magnet 23, an intrinsic coercivity is equal to or larger than 400 [kA/m], and a residual magnetic flux density (remanence) Br is equal to or larger than 1.0 [T]. Each magnet 23 includes a plurality of magnet segments (six magnet segments in this example) 24 which are split in the axial direction. In other words, the magnet 23 is formed by a laminated body that is formed by laminating the plurality of magnet segments 24. Each magnet segment 24 has: a pair of planar surfaces 24*a*, which are parallel to each other and are opposed to each other in the axial direction; and a plurality of magnetic flux acting surfaces each of which extends from a corresponding end of the respective planar surfaces 24*a* in a direction perpendicular to the planar surface 24*a*. Each adjacent two of the planar surfaces 24*a* of the magnet segments 24, which are adjacent to each other in the axial direction, are brought in contact with each other and are fixed together by, for example, a bonding agent, so that the laminated body of the magnet segments 24 are integrated. The magnetic flux acting surfaces 23*a*-23*d* shown in FIG. 3 are formed by the magnetic flux acting surfaces of the magnet segments 24. Specifically, in the magnet segments 24, magnetic flux acting surfaces 25*a* shown in FIG. 4 form the magnetic flux acting surface 23*a* of the right magnet 23, which is placed on the right side of the d-axis in FIG. 3, and magnetic flux acting surfaces 25*b* shown in FIG. 4 form the magnetic flux acting surface 23*b* of the right magnet 23. Furthermore, magnetic flux acting surfaces 25*d* shown in FIG. 4 form the magnetic flux acting surface 23*d* of the right magnet 23. In the magnet segment 24 of the present embodiment, a transverse cross-section of the magnet segment 24, which is perpendicular to the longitudinal direction of the magnet segment 24, is shaped in a rectangle (elongated rectangle). The magnet segments 24 are stacked in the axial direction without skew.

Figure 5:
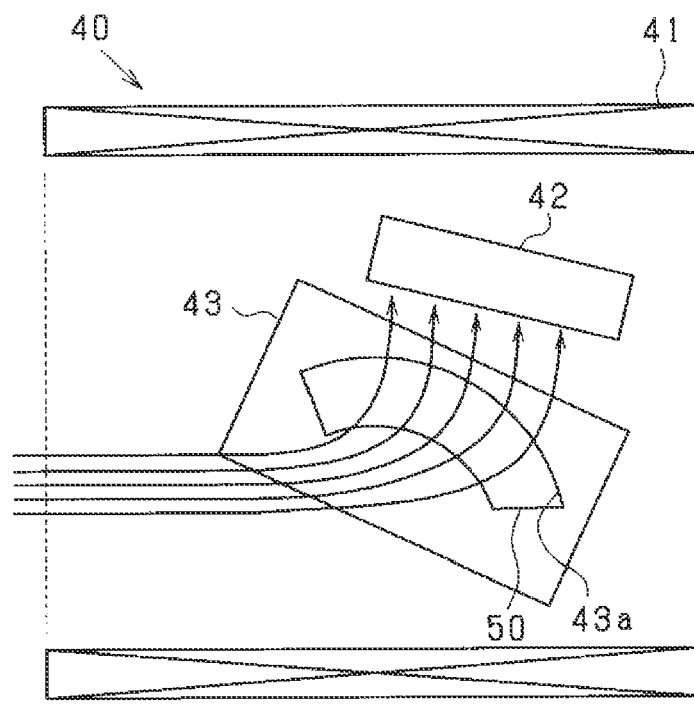
FIG. 5 is a diagram showing an orienting technique for the magnet.

Next, a manufacturing method of the magnet 23 according to the present embodiment will be described. FIG. 5 is a diagram for explaining magnetic orientation in a magnetic field. As shown in FIG. 5, an orienting device 40 includes: a magnetic field coil 41; an orienting iron core 42 placed at an inside of the magnetic field coil 41; and a die (serving as a molding die) 43. The magnetic field coil 41 generates a magnetic field, which passes through the inside of the magnetic field coil 41 in response to energization of the magnetic field coil 41. The orienting iron core 42 has a role of curving the magnetic field, which is generated by the magnetic field coil 41, in a predetermined direction, and the magnetic field, which is curved by the orienting iron core 42, passes through the die 43. The magnetic field coil 41 forms a linear magnetic field, and the orienting iron core 42 forms a curved magnetic field.

The die 43 is made of a non-magnetic material and has a die chamber 43*a* which serves as a molding space formed in conformity with the shape of the magnet 23. The die chamber 43*a* is formed in conformity with the shape of the magnet segment 24. Therefore, the near net shape processing of the magnet segment 24 is possible. The die chamber 43*a* is formed by a die element and distal end portions of upper and lower punches which form the die 43.

Figure 6:
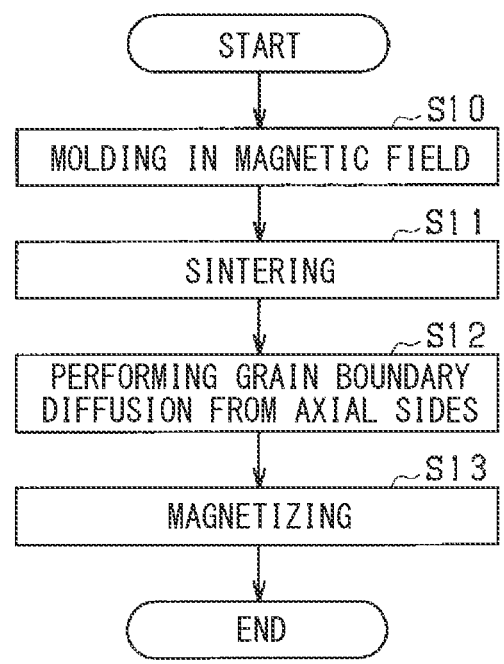
FIG. 6 is a flowchart showing a manufacturing process of the magnet.

Next, the manufacturing process of the magnet 23 will be further described with reference to FIG. 6.

At step S10, magnet powder grains are filled in the die chamber 43*a*, and the filled magnet powder grains are compressed and are molded by the upper and lower punches. At this time, the curved magnetic field is formed by the orienting iron core 42 at the inside of the magnetic field coil 41, and the magnetic field orientation is performed on the magnet powder grains in the die chamber 43*a*. The magnet powder grains are aligned such that easy magnetization directions of the respective magnet powder grains coincide with each other. Therefore, it is possible to obtain a green compact of the magnet powder grains, in which the orientation of the easy magnetization axis at the one location, which is closer to the d-axis than to the q-axis, becomes closer to the orientation of the d-axis than the orientation of the easy magnetization axis at the other location, which is closer to the q-axis than to the d-axis.

Figure 7:
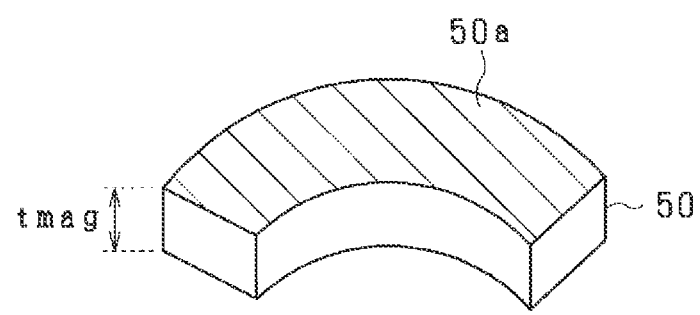
FIG. 7 is a perspective view showing a sintered body of magnet powder grains.

At step S11, the green compact is heated at a sintering device. A sintering temperature of the green compact is, for example, 950° C. to 1050° C. Therefore, as shown in FIG. 7, the sintered body 50, which has the near net shape of the magnet segment 24, is obtained. That is, the sintered body 50 has a pair of planar surfaces 50a, which are parallel to each other, and connecting surfaces (magnetic flux acting surfaces), each of which connects between corresponding ends of the planar surfaces 50a. The sintered body 50 shrinks to about half a volume of the green compact.

At step S12, a grain boundary diffusion process is performed on the sintered body 50. Specifically, an adhering material is adhered to surfaces of the sintered body 50. In the present embodiment, an adhering device applies the adhering material only to the pair of planar surfaces 50a among the surfaces (six surfaces) of the sintered body 50. In FIG. 7, hatching is used to indicate one of the pair of planar surfaces 50a to which the adhering material is adhered.

For example, the adhering material may be powder of an oxide of Dy (dysprosium) or Tb (terbium) which is a heavy rare earth element. Alternatively, the adhering material may be powder of a fluoride of Dy or Tb. Further alternatively, the adhering material may be alloy powder containing Dy or Tb. Additionally, the adhering material may be slurry that contains the powder of the above-described oxide, the powder of the above-described fluoride or the above-described alloy powder. A solvent, which is used in the slurry, is, for example, alcohol. In this case, a coating layer is formed on the pair of planar surfaces 50a, for example, by spraying the adhering material to the pair of planar surfaces 50a from an injector device, which serves as the adhering device, or by coating the adhering material to the pair of planar surfaces 50a by a coating device, which serves as the adhering device.

Furthermore, the adhering material may be a strip or a sheet that contains the powder of the above-described oxide, the powder of the above-described fluoride or the above-described alloy powder.

Next, the sintered body 50, to which the adhering material is adhered, is heated at the heating device. The heating temperature is lower than the sintering temperature of the sintering process and is, for example, 700° C. to 1000° C. By this heating, the heavy rare earth element, which is contained in the adhering material, is diffused into the inside of sintered body 50 through grain boundaries of the surface of the sintered body 50. Thus, a content of the heavy rare earth element at the grain boundary becomes higher than a content of the heavy rare earth element at the inside of the grain. Therefore, the coercivity can be increased while maintaining the residual magnetic flux density. Thereafter, an aging process is performed on the sintered body 50.

Residue remains on the surfaces of the sintered body 50 after the grain boundary diffusion process. Thus, the residue, which is present on the surfaces of the sintered body 50, is subsequently removed by a removing device.

For example, a shot blasting device, which serves as the removing device, may be used to blast a shot material on the residue, which is present on the surfaces of the sintered body 50 subjected to the grain boundary diffusion process, to remove the residue. In this case, after this process, the shot material, which adheres to the sintered body 50, may be removed by an air blasting device. Furthermore, for example, a polishing device, which serves as the removing device, may be used to mechanically polish the surfaces to remove the residue.

Unlike the present embodiment, it is also conceivable to obtain the magnet segment, which has a net shape and has the pair of planar surfaces, by applying a grinding process to the sintered body of the magnet powder grains through use of, for example, a grinding wheel, a cutting blade or a wire saw. However, in this case, depending on the grinding mode of the sintered body, the orientation of the easy magnetization axis of the magnet segment obtained through the grinding may be shifted from the intended orientation of the easy magnetization axis, and thereby the intended magnetic flux may not be realized. With respect to this issue, according to the present embodiment, the sintered body 50 can be obtained through the near net shape processing technique. Thus, it is possible to guarantee the orientation in which a deviation between the orientation of the easy magnetization axis of the magnet segment 24 and the intended orientation of the easy magnetization axis is suitably limited.

Next, at step S13, the sintered body 50 is magnetized by a magnetizing device. Thereby, the magnet segment 24 is obtained. The magnetization may be performed on the individual sintered bodies 50 or on the sintered bodies 50 laminated by the adhesive or the like.

Thereafter, the manufactured magnet segments 24 are used to manufacture the rotor core 21. In the manufacturing process, the operation of the die 43; the operation of the sintering device; the operations of the adhering device, the heating device and the removing device used at step S12; the operation of the magnetizing device and the like are controlled by a controller that includes a microcomputer as a main component thereof.

In the present embodiment, a thickness dimension tmag (see FIG. 7) of the sintered body 50 obtained at step S11 is set to be equal to or smaller than 16 mm. This is in view of the fact that the diffusion of heavy rare earth element is limited to a range that is from the surface of the sintered body to a predetermined depth.

Figure 8:
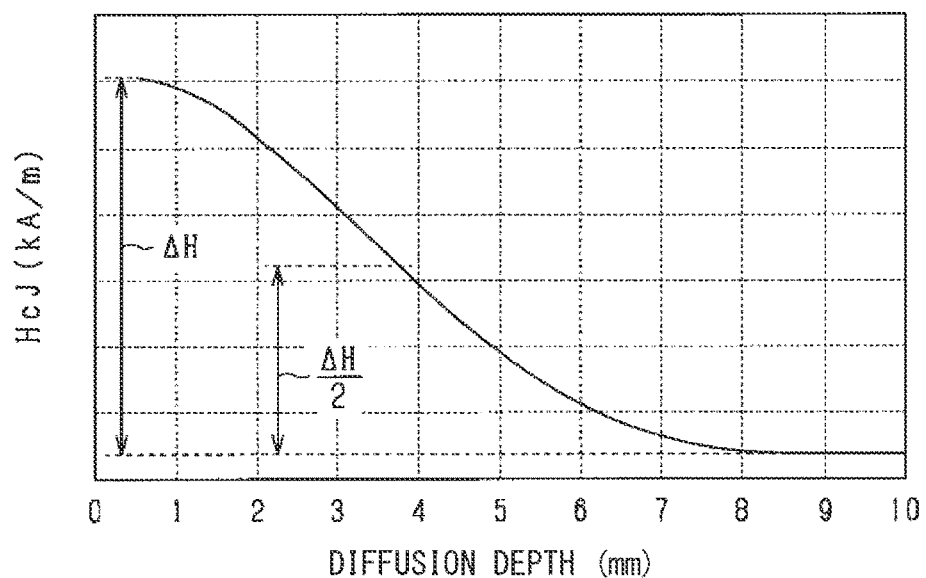
FIG. 8 is a diagram indicating an effect of a grain boundary diffusion process.

FIG. 8 indicates a relationship between: a depth (distance) from the surface of the sintered body, to which the adhering material that includes the heavy rare earth element is adhered; and the coercivity Hcj at the reference temperature (e.g., 23° C.) of the magnet that is manufactured from the sintered body.

As indicated in FIG. 8, when the distance from the surface is increased, the coercivity Hcj is decreased. In a case where the distance is slightly larger than 8 mm, the effect of improving the coercivity Hcj is not seen. The thickness dimension tmag of the sintered body 50 is set to be equal to or smaller than 16 mm in view of the relationship indicated in FIG. 8 and also in view of the adhering of the heavy rare earth element to the pair of planar surfaces 50a.

When the thickness dimension tmag of the sintered body 50 is set to be equal to or smaller than 16 mm, the heavy rare earth element can be suitably diffused into the inside of the sintered body 50, and thereby the coercivity can be suitably improved. In the present embodiment, since the magnet 23 is formed by the laminated body of magnet segments 24, the thickness dimension tmag of the sintered body 50 can be easily reduced, and the thickness dimension tmag can be easily set to be equal to or smaller than 16 mm. Thus, the heavy rare earth element can be diffused throughout the sintered body 50, and the coercivity can be suitably enhanced. Furthermore, with this setting, the coercivity of the surface of the sintered body 50, which becomes the magnetic flux acting surface, can be also enhanced, and thereby demagnetization caused by the eddy current can be suitably limited.

Particularly, in the present embodiment, the grain boundary diffusion process is applied to the sintered body 50 by adhering the adhering material to each of the pair of planar surfaces 50a of the sintered body 50. Therefore, the heavy rare earth element can be more suitably diffused into the inside of the sintered body 50, and the coercivity of the magnet 23 can be more suitably enhanced.

As shown in FIG. 8, a difference between: the coercivity, which is measured at the smallest value of the depth from the surface where the coercivity Hcj is examined; and the coercivity, which no longer shows the effect of the grain boundary diffusion process, is defined as ΔH. In this case, the depth at which the effect of ΔH/2 is obtained, is slightly smaller than 4 mm. Based on the above result, in order to more suitably diffuse the heavy rare earth element throughout the sintered body 50, the thickness dimension tmag of the sintered body 50 may be set to be, for example, equal to or smaller than 8 mm, or equal to or smaller than 6 mm, or equal to or smaller than 5 mm. The lower limit value of the thickness dimension tmag is, for example, 3 mm.

In a case where the stator windings 33 of the rotary electric machine 10 shown in FIGS. 1 to 3 are wound as short pitch windings, a change in the magnetic flux, which flows from the stator 30 and crosses the magnet 23, is larger than a case where the stator windings 33 are wound as full pitch windings, so that the eddy current loss at the magnet 23 tends to be large. Therefore, the merit of applying the characteristic configuration of the present embodiment to the rotary electric machine 10, at which the eddy current loss tends to be large, is great. For example, concentrated short pitch windings may be used as the stator windings 33.

Second Embodiment

Figure 9:
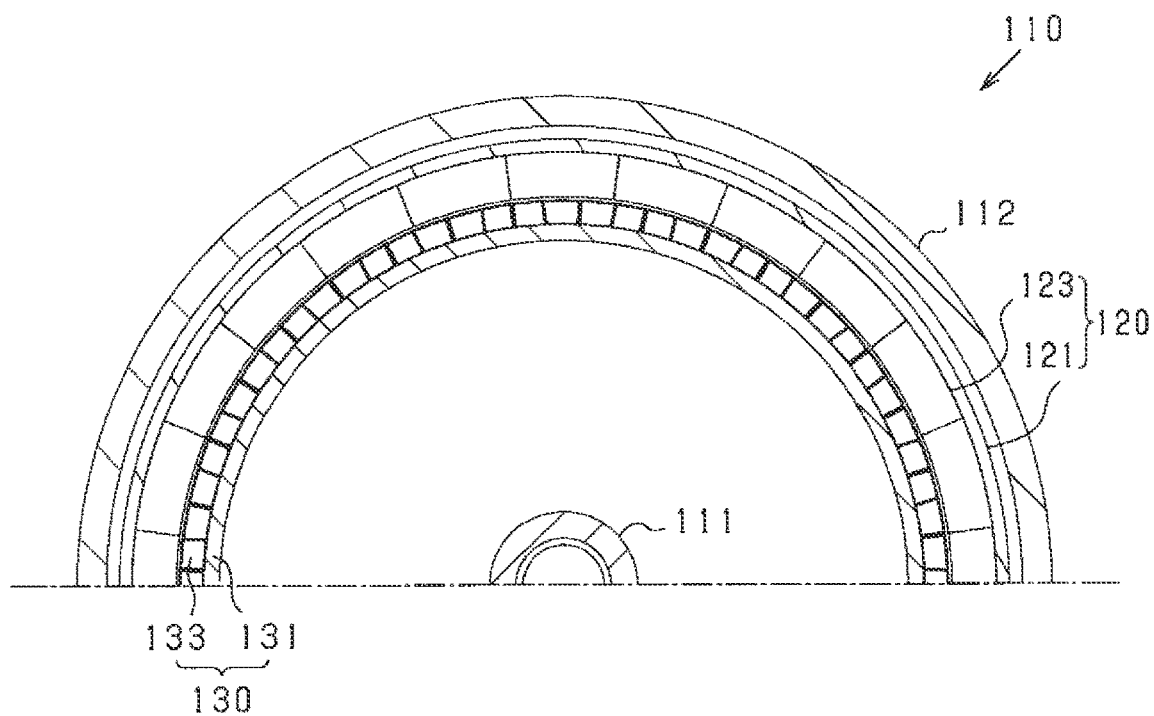
FIG. 9 is a transverse cross-sectional view of a rotary electric machine according to a second embodiment.

Hereafter, a second embodiment will be described with reference to the drawings, focusing on the differences from the first embodiment. In the present embodiment, as shown in FIG. 9, an SPM (Surface Permanent Magnet) motor of an outer rotor type is used as a rotary electric machine 110.

The rotary electric machine 110 includes: a rotary electric machine main body, which has a rotor 120 and a stator 130; and a housing 112, which surrounds the rotary electric machine main body. These members are coaxially arranged relative to a rotatable shaft 111 that is provided integrally with the rotor 120. The rotary electric machine 110 can be mounted on the vehicle by fixing the housing 112 to, for example, a body frame of the vehicle.

The stator 130 surrounds the rotatable shaft 111, and the rotor 120 is placed on a radially outer side of the stator 130. The rotor 120 and the stator 130 are opposed to each other in the radial direction while an air gap is formed between the rotor 120 and the stator 130. When the rotor 120 is rotated integrally with the rotatable shaft 111, the rotor 120 is rotated on the radially outer side of the stator 130. In the present embodiment, the rotor 120 serves as a magnetic field generator, and the stator 130 serves as an armature.

The rotor 120 includes a rotor core 121, which is shaped generally in a cylindrical tubular form, and a plurality of magnets 123, which are fixed to an inner peripheral surface of the rotor core 121. The rotor core 121 is fixed to the rotatable shaft 111. The rotor core 121 functions as a magnet holder member, and the magnets 123 are fixed to a radially inner side of the rotor core 121 and are arranged to form a ring. The rotor core 121 is made of a soft magnetic material and is formed by, for example, stacking a large number of electromagnetic steel plates.

The magnets 123 are arranged in a circular ring form which is concentric with a rotational center of the rotor 120 and are fixed to the inner peripheral surface of the rotor core 121. The magnets 123 are arranged such that the magnetic polarities of the magnets 123 are alternately changed in the circumferential direction of the rotor 120. Therefore, a plurality of magnetic poles are arranged in the circumferential direction. Like in the first embodiment, each of the magnets 123 is formed by a laminated body that is formed by laminating a plurality of magnet segments in the axial direction. The magnet segments are stacked in the axial direction without skew.

Figure 10:
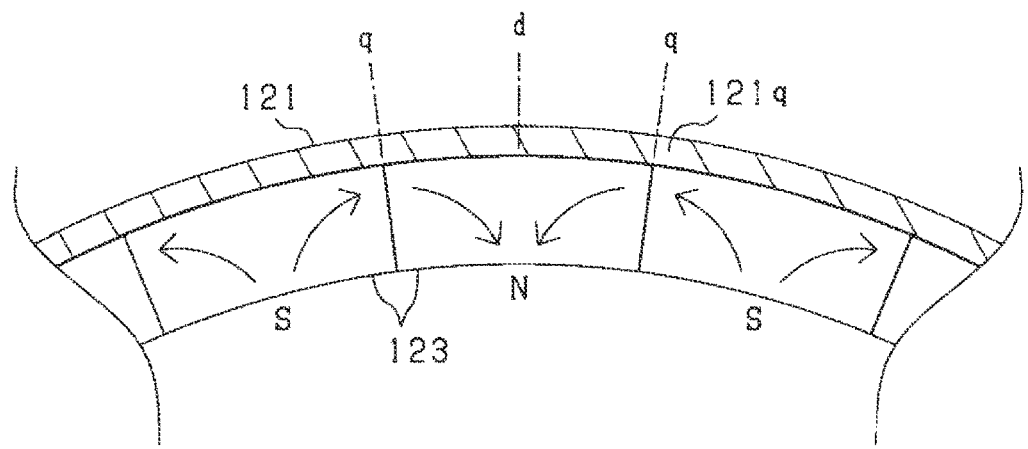
FIG. 10 is a transverse cross-sectional view of a rotor.
Figure 11:
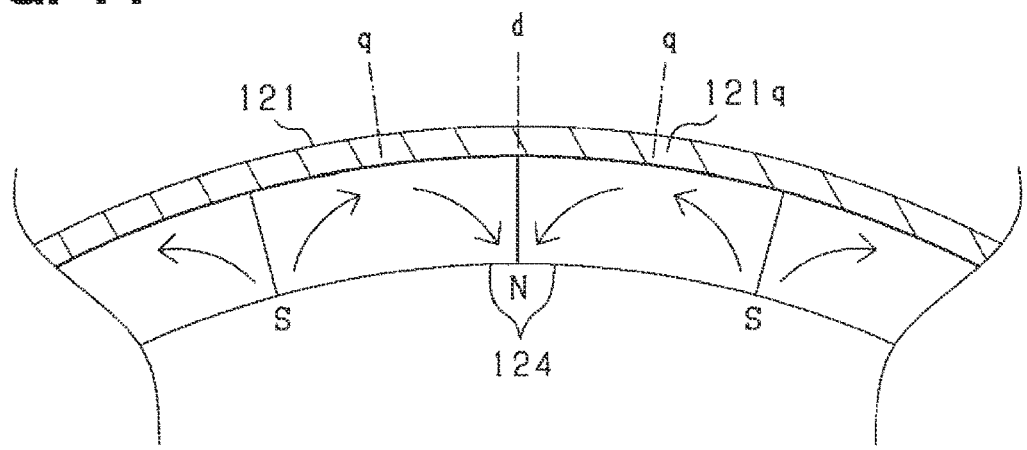
FIG. 11 is a transverse cross-sectional view of a rotor of a modification.
Figure 12:
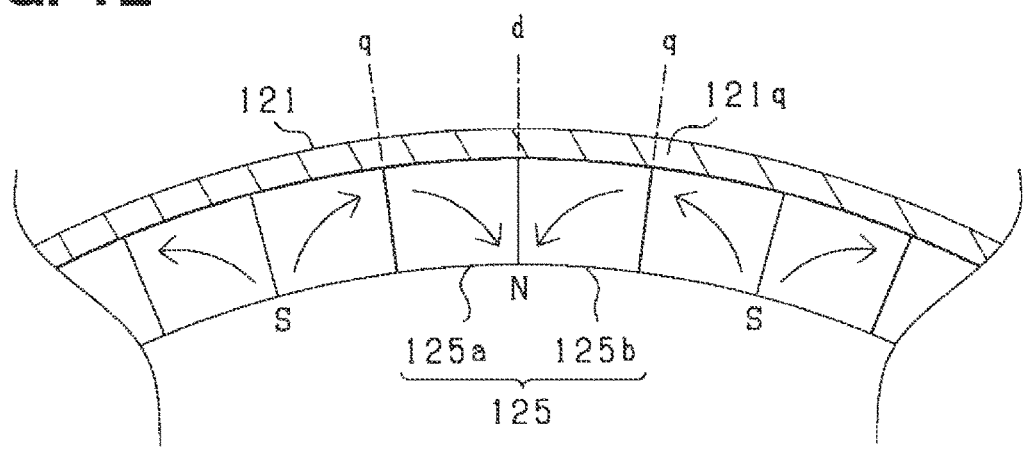
FIG. 12 is a transverse cross-sectional view of a rotor of another modification.

In the present embodiment, as shown in FIG. 10, one magnet 123 forms one magnetic pole and has a split plane on the q-axis. Each circumferentially adjacent two of the magnets 123 are in contact with each other or placed adjacent to each other. These adjacent magnets 123, which are circumferentially placed on one side and another side, respectively, of the corresponding q-axis, are magnetically attracted to each other, so that these adjacent magnets 123 can be kept in contact with each other. Therefore, the structure contributes to improving permeance. Each of a plurality of easy magnetization axes is arcuately oriented about an orientation center set on the q-axis such that the orientation of the easy magnetization axis at one location, which is closer to the d-axis than to the q-axis, is closer to the orientation of the d-axis than the orientation of the easy magnetization axis at another location, which is closer to the q-axis than to the d-axis. Here, it should be noted that a magnet 124, which has a split plane on the d-axis as shown in FIG. 11, or a magnet 125, which has a split plane on the d-axis in addition to the split axis on the q-axis as shown in FIG. 12, may be used as the magnet of the present embodiment. The magnet 125 shown in FIG. 12 forms one magnetic pole by two magnets 125a, 125b which are arranged adjacent to each other in the circumferential direction. Furthermore, a split position of the magnet in the circumferential direction is not limited to those shown in FIGS. 10 to 12 but can be any position. The number of splits of the magnets in the circumferential direction can be increased to the extent that the magnets can be manufactured. Furthermore, the magnet is not limited to the magnet that is split into the magnet segments in the circumferential direction, and a magnet, which is shaped in a circular ring form, may be used as the magnet.

The stator 130 includes a plurality of stator windings 133. The stator windings 133 include a plurality of multi-phase windings, which are arranged at a predetermined sequence in the circumferential direction and are thereby shaped in a cylindrical tubular form. In the present embodiment, a U-phase winding, a V-phase winding and a W-phase winding are used as the phase windings, and thereby the stator windings 133 include the three-phase windings. The stator winding 133 of each phase includes a plurality of conductor segments, each of which extends in the axial direction and is placed in a range that includes a coil side, and transition segments, each of which connects corresponding circumferentially adjacent two of the conductor segments of the same phase.

The stator 130 includes a stator core 131. The stator core 131 is formed as a core sheet laminated body that includes a plurality of core sheets which are electromagnetic steel plates (made of a magnetic material) and are stacked in the axial direction while the core sheet laminated body is shaped in a cylindrical tubular form that has a predetermined thickness in the radial direction. The stator windings 133 are assembled to a radially outer side, which is the rotor 120 side, of the stator core 131. An outer peripheral surface of the stator core 131 forms a smooth curved surface that does not have recesses and projections. The stator core 131 functions as a back yoke. The stator core 131 is formed by axially stacking the core sheets, each of which is stamped and is shaped in a circular ring plate form. Here, it should be noted that a stationary core, which has a helical core structure, may be used as the stator core 131.

In the present embodiment, the stator 130 has a slotless structure that does not have teeth for forming slots. The structure of the stator 130 may be any one of the following (A) to (C).

(A) The stator 130 has a plurality of inter-conductor members, each of which is disposed between corresponding conductor segments in the circumferential direction. As the inter-conductor members, there is used a magnetic material which satisfies a relation of Wt×Bs≤Wm×Br where: Wt is a width of the inter-conductor members in the circumferential direction within one magnetic pole; Bs is a saturation magnetic flux density of the inter-conductor members; Wm is a width of the magnet 132 in the one magnetic pole in the circumferential direction; and Br is a residual magnetic flux density in the magnet 132.

(B) The stator 130 has the inter-conductor members, each of which is disposed between the corresponding adjacent two of the conductor segments in the circumferential direction. The inter-conductor members are made of a non-magnetic material.

(C) The stator 130 has no inter-conductor member disposed between the conductor segments in the circumferential direction.

In the present embodiment, there is implemented a state where at least a portion (specifically, for example, a magnet 123 side portion in the radial direction) of a q-axis core portion 121q (see FIG. 10) of the rotor core 121 is placed in a magnetically saturated state by a magnetic flux of the magnet 123. The q-axis core portion 21q is a portion of the rotor core 121, which extends across the q-axis. The magnetic permeability at the portion, which is magnetically saturated in the q-axis core portion 121q, is reduced, and the inductance is reduced. Therefore, the amount of magnetic flux, which is generated in response to the energization of the stator windings 133 and crosses the magnet 123, can be reduced. As a result, generation of the eddy current loss of the magnet 123 can be limited.

The magnetic saturation of the q-axis core portion 121q by the magnetic flux of the magnet 123 can be realized by: the configuration in which the magnet 123 is oriented such that the orientation of the easy magnetization axis at the one location, which is closer to the d-axis than to the q-axis, is closer to the orientation of the d-axis than the orientation of the easy magnetization axis at the other location, which is closer to the q-axis than to the d-axis, as shown in FIG. 10; and the slotless structure described above.

Furthermore, a manufacturing method of the magnet segments, which form the magnet 123 of the present embodiment, is similar to that of the first embodiment.

Other Embodiments

The above-described embodiments may be modified as follows.

At the step of the grain boundary diffusion process, the adhering material may be adhered to only one of the pair of planar surfaces 50a of the sintered body 50. In this case, the thickness dimension tmag of the sintered body 50 should preferably be equal to or smaller than 8 mm, and more preferably equal to or smaller than 4 mm.

The rotary electric machine of the first embodiment is not limited to the inner rotor type and may be an outer rotor type. The rotary electric machine of the second embodiment is not limited to the outer rotor type and may be an inner rotor type.

The orientation technique of the magnet is not limited to the orientation technique indicated in FIG. 3 or FIGS. 10 to 12 and may be any other technique as long as the orientation of the easy magnetization axis at the one location, which is closer to the d-axis than to the q-axis, is closer to the orientation of the d-axis than the orientation of the easy magnetization axis at the other location, which is closer to the q-axis than to the d-axis.

The rotary electric machine is not limited to the rotary electric machine, in which the magnetic field generator among the magnetic field generator and the armature is the rotor. For instance, the rotary electric machine may be a rotary electric machine, in which the armature is the rotor.

The disclosure in this specification is not limited to the illustrated embodiments. The disclosure encompasses the illustrated embodiments and variations, which are conceivable by those skilled in the art based on the illustrated embodiment(s). For example, the disclosure is not limited to the combination of the components and/or elements indicated in the embodiment(s). The disclosure can be implemented in a variety of combinations. The disclosure may have additional parts that can be added to the embodiment(s). The disclosure includes variations, in which some of the components and/or elements of the embodiment(s) is/are omitted. The Disclosure encompasses the replacement or combination of the components and/or elements between one of the embodiments and another one of the embodiments. The disclosed technical scope is not limited to the technical scope described in the embodiment(s). Some disclosed technical scope should include the technical scope indicated by the statement of claim(s) and all of equivalents to the technical scope indicated by the statement of claim(s).

Although the present disclosure has been described with reference to the embodiments and the modifications, it is understood that the present disclosure is not limited to the embodiments and the modifications and structures described therein. The present disclosure also includes various variations and variations within the equivalent range. Also, various combinations and forms, as well as other combinations and forms that include only one element, more, or less, are within the scope and ideology of the present disclosure.

What is claimed is:

1. A manufacturing method of a rotary electric machine that includes:
   a magnetic field generator which includes a plurality of magnets, wherein the plurality of magnets form a plurality of magnetic poles, and polarities of the plurality of magnetic poles are alternately changed in a circumferential direction; and
   an armature which includes a plurality of multi-phase armature windings and is placed at a location, at which the armature is opposed to the magnetic field generator in a radial direction, wherein one of the magnetic field generator and the armature is a rotor, and each of the plurality of magnets is formed by a laminated body of a plurality of magnet segments which are split in an axial direction of the rotor, the manufacturing method comprising:
   sintering each of a plurality of green compacts, which are respectively formed by compressing and molding magnet powder grains, to obtain a plurality of sintered bodies, each of which has a pair of planar surfaces that are opposed to each other;
   applying a grain boundary diffusion process on each of the plurality of sintered bodies by adhering an adhering material, which includes a heavy rare earth element, to at least one of the pair of planar surfaces of each of the plurality of sintered bodies, and then heating each of the plurality of sintered bodies to diffuse the heavy rare earth element into an inside of the sintered body; and forming the laminated body of the plurality of magnet segments by placing a corresponding one of the pair of planar surfaces, on which the grain boundary diffusion process is applied, of one of each adjacent two of the plurality of sintered bodies in contact with a corresponding one of the pair of planar surfaces, on which the grain boundary diffusion process is applied, of another one of each adjacent two of the plurality of sintered bodies.

2. The manufacturing method of the rotary electric machine according to claim 1, wherein the applying of the grain boundary diffusion process includes adhering the adhering material only to the at least one of the pair of planar surfaces among a plurality of surfaces of each of the plurality of sintered bodies and then heating each of the plurality of sintered bodies.

3. The manufacturing method of the rotary electric machine according to claim 2, wherein the applying of the grain boundary diffusion process includes adhering the adhering material only to each of the pair of planar surfaces among the plurality of surfaces of each of the plurality of sintered bodies and then heating each of the plurality of sintered bodies.

4. The manufacturing method of the rotary electric machine according to claim 3, wherein a thickness dimension of each of the plurality of sintered bodies, on which the grain boundary diffusion process is applied, is equal to or smaller than 16 mm.

5. The manufacturing method of the rotary electric machine according to claim 4, wherein the thickness dimension of each of the plurality of sintered bodies, on which the grain boundary diffusion process is applied, is equal to or smaller than 8 mm.

6. The manufacturing method of the rotary electric machine according to claim 2, wherein:
the applying of the grain boundary diffusion process includes adhering the adhering material only to one of the pair of planar surfaces among the plurality of surfaces of each of the plurality of sintered bodies and then heating each of the plurality of sintered bodies; and
a thickness dimension of each of the plurality of sintered bodies, on which the grain boundary diffusion process is applied, is equal to or smaller than 8 mm.

7. The manufacturing method of the rotary electric machine according to claim 6, wherein the thickness dimension of each of the plurality of sintered bodies, on which the grain boundary diffusion process is applied, is equal to or smaller than 4 mm.

8. The manufacturing method of the rotary electric machine according to claim 1, comprising obtaining the plurality of green compacts, in each of which an orientation of an easy magnetization axis at one location, which is closer to a d-axis serving as a magnetic pole center than to a q-axis serving as a magnetic pole boundary, is closer to an orientation of the d-axis than an orientation of the easy magnetization axis at another location, which is closer to the q-axis than to the d-axis, by filling the magnet powder grains into a molding space of a molding die formed in conformity with a shape of each of the plurality of magnet segments and then compressing and molding the magnet powder grains filled in the molding space in a magnetic field; and the sintering of each of the plurality of green compacts results in that each of the plurality of sintered bodies has a near net shape of a corresponding one of the plurality of magnet segments.

9. A rotary electric machine comprising:
a magnetic field generator which includes a plurality of magnets, wherein the plurality of magnets form a plurality of magnetic poles, and polarities of the plurality of magnetic poles are alternately changed in a circumferential direction; and
an armature which includes a plurality of multi-phase armature windings and is placed at a location, at which the armature is opposed to the magnetic field generator in a radial direction, wherein:
one of the magnetic field generator and the armature is a rotor;
each of the plurality of magnets is formed by a laminated body of a plurality of magnet segments which are split in an axial direction of the rotor; and
only a contact surface among a plurality of surfaces of each of each adjacent two of the plurality of magnet segments, which are adjacent to each other in the axial direction, is treated by grain boundary diffusion of a heavy rare earth element for diffusing the heavy rare earth element from the contact surface into an inside of the magnet segment while the contact surfaces of each adjacent two of the plurality of magnet segments contact with each other.

10. The rotary electric machine according to claim 9, wherein:
the magnetic field generator includes a magnetic field generator core, to which the plurality of magnets are installed;
each of the plurality of magnets is oriented such that an orientation of a easy magnetization axis at one location, which is closer to a d-axis serving as a magnetic pole center than to a q-axis serving as a magnetic pole boundary, is closer to an orientation of the d-axis than an orientation of the easy magnetization axis at another location, which is closer to the q-axis than to the d-axis; and
at least a portion of a q-axis core portion of the magnetic field generator core is placed in a magnetically saturated state by a magnetic flux of one or more of the plurality of magnets.

11. The rotary electric machine according to claim 10, wherein each of the plurality of magnets is embedded in the magnetic field generator core.

12. The rotary electric machine according to claim 10, wherein each of the plurality of magnets is installed to a peripheral surface of the magnetic field generator core which faces the armature in the radial direction.

13. The rotary electric machine according to claim 9, wherein the plurality of multi-phase armature windings are wound as a plurality of short pitch windings.

14. A rotary electric machine comprising:
a magnetic field generator that includes:
a plurality of magnets, wherein the plurality of magnets form a plurality of magnetic poles, and polarities of the plurality of magnetic poles are alternately changed in a circumferential direction; and
a magnetic field generator core, to which the plurality of magnets are installed; and
an armature which includes a plurality of multi-phase armature windings and is placed at a location, at which the armature is opposed to the magnetic field generator in a radial direction, wherein:
one of the magnetic field generator and the armature is a rotor;

each of the plurality of magnets is oriented such that an orientation of a easy magnetization axis at one location, which is closer to a d-axis serving as a magnetic pole center than to a q-axis serving as a magnetic pole boundary, is closer to an orientation of the d-axis than an orientation of the easy magnetization axis at another location, which is closer to the q-axis than to the d-axis; and at least a portion of a q-axis core portion of the magnetic field generator core is placed in a magnetically saturated state by a magnetic flux of one or more of the plurality of magnets.

15. The rotary electric machine according to claim 14, wherein each of the plurality of magnets is embedded in the magnetic field generator core.

16. The rotary electric machine according to claim 14, wherein each of the plurality of magnets is installed to a peripheral surface of the magnetic field generator core which faces the armature in the radial direction.

17. The rotary electric machine according to claim 14, wherein the plurality of multi-phase armature windings are wound as a plurality of short pitch windings.

\* \* \* \* \*